United States Patent
Takeshima et al.

(10) Patent No.: US 9,787,190 B2
(45) Date of Patent: Oct. 10, 2017

(54) POWER CONVERSION DEVICE AND IN-VEHICLE POWER SUPPLY DEVICE EQUIPPED WITH SAME

(75) Inventors: Yoshihiro Takeshima, Tokyo (JP); Masaki Yamada, Tokyo (JP); Takuto Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 985 days.

(21) Appl. No.: 14/111,314

(22) PCT Filed: Feb. 6, 2012

(86) PCT No.: PCT/JP2012/052617
§ 371 (c)(1),
(2), (4) Date: Oct. 11, 2013

(87) PCT Pub. No.: WO2012/144249
PCT Pub. Date: Oct. 26, 2012

(65) Prior Publication Data
US 2014/0028092 A1    Jan. 30, 2014

(30) Foreign Application Priority Data
Apr. 18, 2011 (JP) ................................ 2011-091910

(51) Int. Cl.
*H02M 3/335* (2006.01)
*B60L 11/18* (2006.01)
*H02M 3/337* (2006.01)

(52) U.S. Cl.
CPC ..... *H02M 3/33507* (2013.01); *B60L 11/1812* (2013.01); *H02M 3/3376* (2013.01);
(Continued)

(58) Field of Classification Search
CPC .......... H02M 3/22; H02M 3/24; H02M 3/325; H02M 3/335; H02M 3/28; H02M 3/33569
USPC ......................................................... 363/17
See application file for complete search history.

(56) References Cited

U.S. PATENT DOCUMENTS

| 4,992,919 A | * | 2/1991 | Lee | ..................... H02M 3/3376 363/132 |
| 2002/0054498 A1 | * | 5/2002 | Cho | .................... H02M 3/3376 363/132 |

(Continued)

FOREIGN PATENT DOCUMENTS

| JP | 10 14217 | 1/1998 |
| JP | 2003 134817 | 5/2003 |

(Continued)

OTHER PUBLICATIONS

International Search Report dated Apr. 17, 2012 in PCT/JP12/052617 Filed Feb. 6, 2012.
(Continued)

*Primary Examiner* — Adolf Berhane
*Assistant Examiner* — Afework Demisse
(74) *Attorney, Agent, or Firm* — Oblon, McClelland, Maier & Neustadt, L.L.P.

(57) ABSTRACT

In a DC/DC converter that performs zero-voltage switching, capacitors are connected respectively in parallel to first and second MOSFETs that are included in an inverter unit in the primary-side of a transformer, and an inductor is connected to an AC output line. In a range of a current being more than a predetermined value, a control circuit controls the inverter unit using a PWM control with a fixed dead time, and in a light load range where the current is equal to or less than the predetermined value, the control unit changes the control to a PFM control and decreases a frequency so that the dead time becomes longer as the current decreases, to thereby keep a duty ratio without change.

20 Claims, 7 Drawing Sheets

(52) U.S. Cl.
CPC ....... *B60L 2210/10* (2013.01); *B60L 2210/30* (2013.01); *B60L 2210/40* (2013.01); *Y02T 10/7005* (2013.01); *Y02T 10/7072* (2013.01); *Y02T 10/7216* (2013.01); *Y02T 10/7241* (2013.01); *Y02T 90/127* (2013.01); *Y02T 90/14* (2013.01)

(56) References Cited

U.S. PATENT DOCUMENTS

| | | |
|---|---|---|
| 2004/0136209 A1 | 7/2004 | Hosokawa et al. |
| 2005/0041439 A1* | 2/2005 | Jang .................. H02M 7/5387 363/17 |
| 2011/0019440 A1 | 1/2011 | Shimada et al. |
| 2013/0057200 A1* | 3/2013 | Potts ................ H02M 3/33584 320/107 |

FOREIGN PATENT DOCUMENTS

| | | |
|---|---|---|
| JP | 2003-174773 A | 6/2003 |
| JP | 2004 140913 | 5/2004 |
| JP | 2004 236461 | 8/2004 |
| JP | 2007 221915 | 8/2007 |
| JP | 2009 55747 | 3/2009 |
| JP | 2010 172146 | 8/2010 |

OTHER PUBLICATIONS

Office Action dated Sep. 15, 2014 in German Patent Application No. 11 2012 001 746.3 (with English language translation).

* cited by examiner

POWER CONVERSION DEVICE AND IN-VEHICLE POWER SUPPLY DEVICE EQUIPPED WITH SAME

TECHNICAL FIELD

This invention relates to a power conversion device which outputs a DC power after converting it into a DC power with a different voltage, and an in-vehicle power supply device equipped with the same.

BACKGROUND ART

In order to reduce carbon dioxide emission from vehicles, there is strong demand of improving fuel consumption so as to enhance utilization efficiency of energy. Recently, in addition to traditional vehicles that run by a conventional engine only, electric vehicles such as hybrid electric vehicles that combine an engine and a motor-generator and battery electric vehicles that run by a motor only, have appeared and such electric vehicles are rapidly becoming popular. In the electric vehicles, in addition to a conventional low-voltage battery which is a lead battery, a high-voltage battery, such as a nickel-hydride battery and a lithium-ion battery, is used for supplying power to the motor-generator.

In the electric vehicles, there is no electric generator (alternator), and instead, an insulated type DC-DC converter that takes an input from the high-voltage battery is used, which serves to supply power to the low-voltage battery (lead battery) and a low-voltage load that corresponds to conventional electrical components. As a conventional power conversion device that establishes connection between different voltage sides of the high-voltage battery and the low-voltage battery and low-voltage load, there has been provided a following device.

The conventional power conversion device includes a full-bridge switching circuit that is disposed between an input terminal and a transformer and that has first and second arms, an output circuit disposed between an output terminal and the transformer, and a control circuit that performs a phase shift control of the switching circuit. In the switching circuit, a diode and a capacitor are connected in parallel to each of switching elements, the midpoint of the first arm is connected to one end of the primary winding of the transformer through a resonant inductor, and the midpoint of the second arm is connected to the other end of the primary winding of the transformer.

The control circuit has a current detection unit for detecting pulse components that emerge in a primary-side current flowing between the input terminal and the switching circuit during an output non-delivery period, and a dead-time setting unit for changing a dead time for at least one of the first and second arms on the basis of the detection result by the current detection unit.

CITATION LIST

Patent Document

Patent Document 1: Japanese Patent Application Laid-open No. 2004-140913

SUMMARY OF THE INVENTION

Problems to be Solved by the Invention

In the above conventional power conversion device, a PWM control (Pulse Width Modulation Control) is performed which controls an ON/OFF ratio of the switching element at a fixed operating frequency. By controlling the dead time at which both switching elements of the arms are made OFF to become longer as the load becomes lighter, charging/discharging the charges of the parallel capacitor of each switching element is made completed within the dead time, to thereby achieve soft-switching operation which reduces switching loss.

However, since the switching operations are performed at a fixed operating frequency, if a long dead time is set, the effective ON-period becomes short, so that the necessary duty ratio to obtain an intended output voltage could not be fulfilled. For that reason, if an upper limit is set for the dead time in order to ensure the necessary duty ratio, then soft-switching operation could not be established in a light load range, to thereby increase switching loss. In this situation, at every time the switching element changes from OFF-state to ON-state, both ends of the parallel capacitor is short-circuited to wastefully consume energy stored in the parallel capacitor, thereby causing a large increase in the loss.

This invention has been made to solve the problem as described above, and an object thereof is to enable the semiconductor switching element to perform soft-switching operation over a wide range of load so as to reduce power loss in a power conversion device, to thereby improve power conversion efficiency thereof. Further, a second object thereof is to provide an in-vehicle power supply device to be installed in vehicles, which is equipped with the power conversion device thus-improved in power conversion efficiency.

Means for Solving the Problems

A power conversion device according to the invention comprises: a DC/DC converter that includes an inverter unit having two serial semiconductor switching elements, for converting a DC power to an AC power, a rectifier circuit for rectifying an AC output from the inverter unit, and a smoothing circuit for smoothing a rectified voltage to output a DC power to a load; and a control circuit for controlling the inverter unit. The inverter unit includes capacitors connected respectively in parallel to the semiconductor switching elements, and an inductor connected to a line of the AC output. Besides, the control circuit changes a dead time, which is a time period where both of said two serial semiconductor switching elements are made OFF, according to a circuit current flowing through the DC/DC converter, so as to cause the respective semiconductor switching elements to perform zero-voltage switching; and at least in the range of the circuit current being equal to or less than a predetermined value, the control circuit controls the inverter unit using a PFM control.

Further, an in-vehicle power supply device according to the invention comprises the power conversion device and a battery for driving a motor for running, wherein a DC power is input from the battery to the inverter unit in the power conversion device.

Effect of the Invention

According to the invention, the control circuit changes the dead time, which is a time period where both of the two serial semiconductor switching elements are made OFF, according to the circuit current flowing through the DC-DC converter, and at least in a low current range of the circuit current, the control circuit controls the inverter unit using a PFM control. Thus, it becomes possible to change the dead time so that the respective semiconductor switching elements perform zero-voltage switching, while fulfilling the necessary duty ratio, even in the low current range, and therefore, the semiconductor switching elements can perform zero-voltage switching over a wide range of load. This makes it possible to largely reduce power loss, to thereby achieve a power conversion device with high conversion efficiency.

Further, according to the invention, there is achieved an in-vehicle power supply device which generates from a battery for driving a motor for running, a source power of a different DC voltage with high power conversion efficiency, and supplies it to the load.

MODES FOR CARRYING OUT THE INVENTION

Embodiment 1

Hereinafter, a power conversion device and an in-vehicle power supply device according to Embodiment 1 of the invention will be described bases on the drawings.

Figure 1:
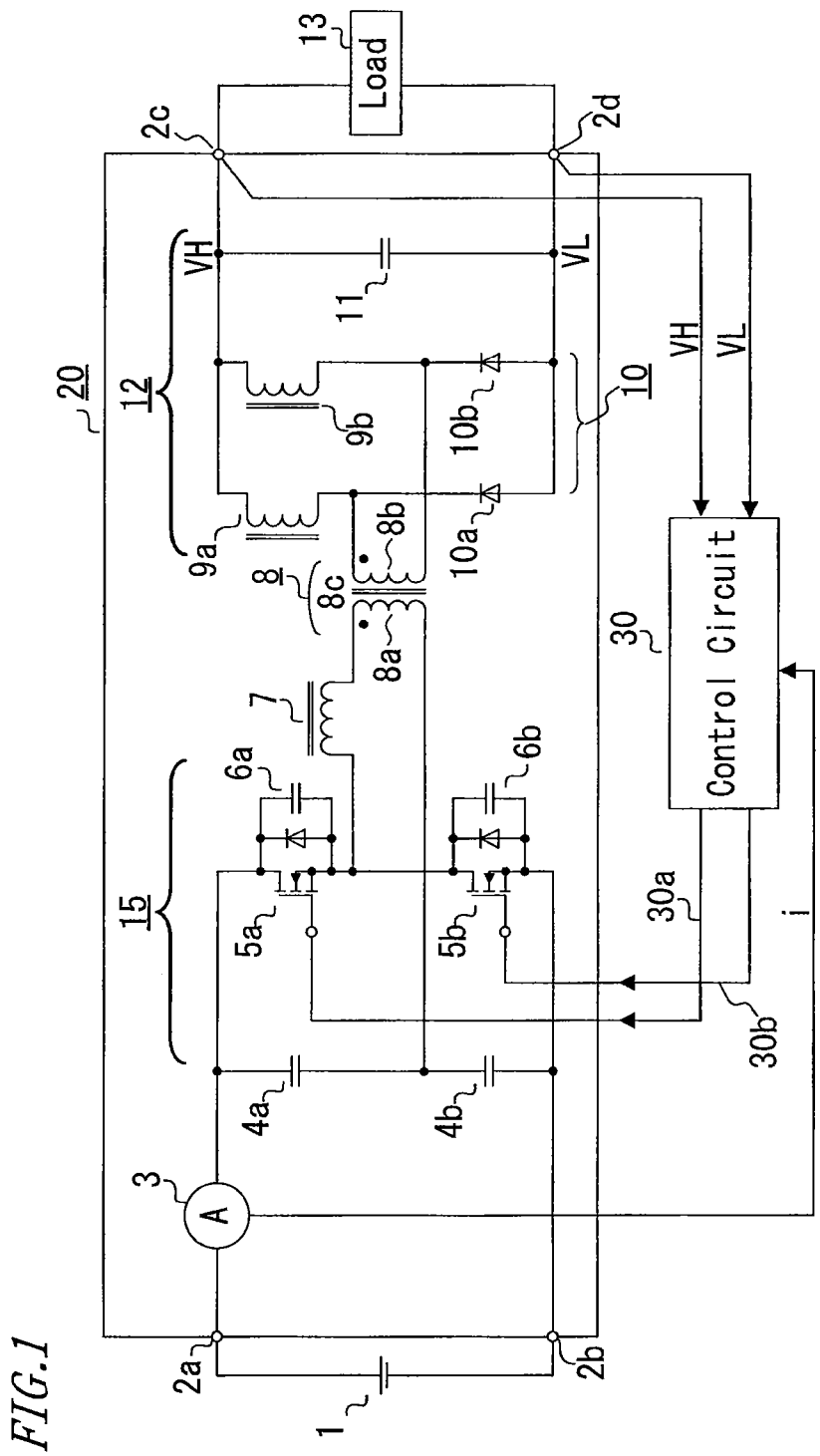
FIG. 1 is a configuration diagram of a power conversion device and an in-vehicle power supply device according to Embodiment 1 of the invention.

FIG. 1 is a configuration diagram of a DC-DC converter device as the power conversion device and the in-vehicle power supply device, according to Embodiment 1 of the invention. As shown in FIG. 1, the in-vehicle power supply device is configured with a high-voltage battery 1 for driving a motor for vehicle running and a DC/DC converter device for converting the voltage from the battery 1 to a different voltage and supplies it to a load 13. The DC/DC converter device includes a main circuit 20 and a control circuit 30, and hereinafter, the main circuit 20 of the DC/DC converter device is simply referred to as DC/DC converter 20.

The DC/DC converter 20 includes an insulated transformer 8, an inverter unit 15 that is connected to the primary side of the transformer 8 and converts the DC voltage between input terminals 2a and 2b into an AC voltage, a rectifier circuit 10 connected to the secondary side of the transformer 8, and a smoothing circuit 12 that smooths the rectified voltage and outputs it to between output terminals 2c and 2d.

The inverter unit 15 is configured with first and second voltage-dividing capacitors 4a, 4b that are serially connected to each other between DC bus lines, and a half-bridge inverter having first and second MOSFETs (Field Effect Transistors) 5a, 5b as two serial semiconductor switching elements. To the first and second MOSFETs 5a, 5b, diodes are connected in inverse parallel connection, respectively. Note that, as the diode, a parasitic diode inherent in the element may be used. This inverter unit 15 is a zero-voltage switching circuit that can reduce, at the time of switching of the first and second MOSFET 5a, 5b, the voltage between both ends of the element to almost zero, in which first and second capacitors 6a, 6b are connected in parallel to the first and second MOSFETs 5a, 5b, respectively. In addition, an inductor 7 is connected in an AC output line between the first and second MOSFETs 5a, 5b and a primary winding 8a of the transformer 8.

Meanwhile, the rectifier circuit 10 is configured with diodes 10a, 10b, and the smoothing circuit 12 is configured with inductors 9a, 9b and a smoothing capacitor 11.

Further, a current detector 3 that detects a current "i" as a circuit current flowing through the DC/DC converter 20, is provided, in this case, in the DC bus line of the input side of the inverter unit 15.

A control circuit 30 that makes output control of the inverter unit 15 is placed outwardly to the DC/DC converter 20. Respective potentials VH, VL of the output terminals 2c, 2d and the current i detected by the current detector 3 are input to the control circuit 30, so that the control circuit generates and outputs first and second gate signals 30a, 30b to the first and second MOSFETs 5a, 5b in the inverter unit 15.

Details about connections of respective units of the in-vehicle power supply device will be described below.

The battery 1 is connected between the input terminals 2a and 2b. The input terminal 2a is connected to one end of the current detector 3, and the other end of the current detector 3 is connected to each of a first terminal of the first voltage-dividing capacitor 4a and a drain terminal of the first MOSFET 5a. The input terminal 2b is connected to each of a first terminal of the second voltage-dividing capacitor 4b and a source terminal of the second MOSFET 5b. A second terminal of the first voltage-dividing capacitor 4a and a second terminal of the second voltage-dividing capacitor 4b are connected to each other, and a source terminal of the first MOSFET 5a and a drain terminal of the second MOSFET 5b are connected to each other. A connection point between the first MOSFET 5a and the second MOSFET 5b, and one end of the inductor 7 are connected, and the other end of the inductor 7 and a first terminal of the primary winding 8a of the transformer 8 are connected. The first capacitor 6a is connected between the drain and the source of the first MOSFET 5a, and the second capacitor 6b is connected between the drain and the source of the second MOSFET 5b.

A second terminal of the primary winding 8a of the transformer 8 and a connection point between the first voltage-dividing capacitor 4a and the second voltage-dividing capacitor 4b, are connected. A first terminal of a secondary winding 8b of the transformer 8 is connected to each of a first terminal of the inductor 9a and a cathode terminal of the diode 10a; and a second terminal of the secondary winding 8b of the transformer 8 is connected to each of a first terminal of the inductor 9b and a cathode terminal of the diode 10b. The smoothing capacitor 11 is connected between the output terminals 2c and 2d. Second terminals of the respective inductors 9a, 9b are each connected to one end of the smoothing capacitor 11, and the cathode terminals of the respective diodes 10a, 10b are each connected to the other end of the smoothing capacitor 11. And, the load 13 is connected between the output terminals 2c and 2d.

Gate terminals of the first and second MOSFETs 5a, 5b are connected to the control circuit 30 which is also connected to the output terminals 2c, 2d and the current detector 3.

An operation of the in-vehicle power supply device thus-configured will be described below.

Figure 2:
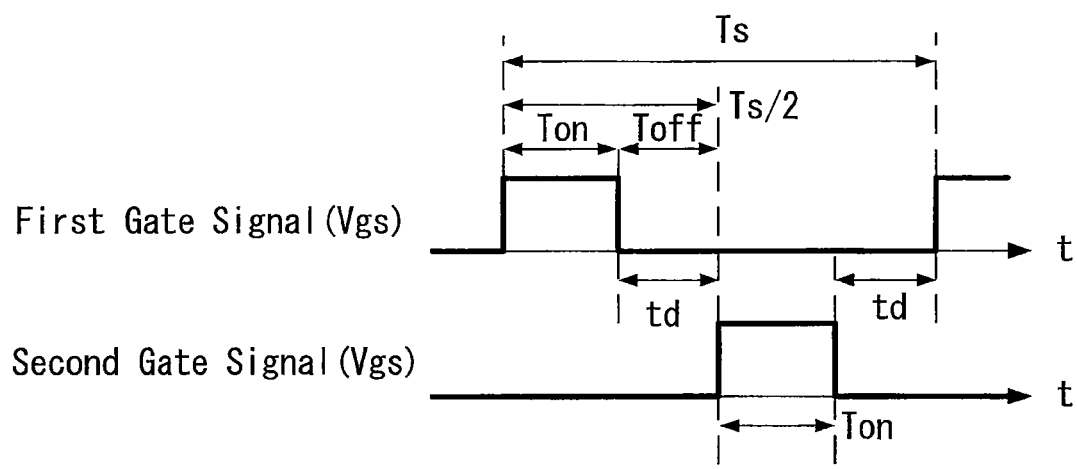
FIG. 2 is a waveform diagram of gate signals in the power conversion device according to Embodiment 1 of the invention.

When a voltage Vin of the battery 1 is connected to be applied between the input terminals 2a and 2b, it is divided into each voltage of ½·Vin by the first voltage-dividing capacitor 4a and the second voltage-dividing capacitor 4b. FIG. 2 shows first and second gate signals 30a, 30b for the first and second MOSFETs 5a, 5b in the inverter unit 15, and accordingly, the first MOSFET 5a and the second MOSFET 5b repeat complementary ON-OFF operations. A time period where both of the first MOSFET 5a and the second MOSFET 5b are made OFF, is given as a dead time "td". Note that, in FIG. 2, "Ts" represents a cycle of switching, "Ton" represents ON-period of each of the first and second MOSFETs 5a, 5b, "Toff" represents OFF period after "Ton" of each of the first and second MOSFETs 5a, 5b in a half cycle of Ts/2, and here is given as Toff=td.

First, when the first MOSFET 5a is in ON-state and the second MOSFET 5b is in OFF-state, in the primary side of the transformer 8, a current flows by a route of first voltage-dividing capacitor 4a→first MOSFET 5a→inductor 7→transformer's primary winding 8a, so that a voltage of ½·Vin is applied to the transformer's primary winding 8a. As a result, in the secondary side of the transformer 8, a voltage determined by a turn ratio of the transformer is induced in the transformer's secondary winding 8b, whereby a current flows by a route of transformer's secondary winding 8b→inductor 9a→smoothing capacitor 11→diode 10b, so that power transfer is achieved from the primary side to the secondary side of the transformer 8.

Then, when the first MOSFET 5a is turned OFF to enter the period of dead time td, since the inductor 7 has a nature of going to keep flowing a current, in the primary side of the transformer 8, currents flow by a route of inductor 7→transformer's primary winding 8a→first voltage-dividing capacitor 4a→capacitor 6a, and by a route of inductor 7→transformer's primary winding 8a→second voltage-dividing capacitor 4b→capacitor 6b. At this time, due to the effect of the capacitor 6a, a voltage rise of the voltage between both ends of the first MOSFET 5a is made slower. This type of switching is called generally as zero-voltage switching, by which switching loss is reduced to almost zero.

Further, since the sum of the respective voltages of the capacitor 6a and the capacitor 6b is equal to Vin that is the voltage sum of the first and second voltage-dividing capacitors 4a, 4b, the voltage between both ends of the capacitor 6b decreases as the voltage between both ends of the capacitor 6a increases. This condition continues until the voltage of the capacitor 6a becomes nearly equal to the voltage sum Vin of the first and second voltage-dividing capacitors 4a, 4b so that the voltage of the capacitor 6b becomes almost zero.

Further at this time, in the secondary side of the transformer 8, currents flow by a route of inductor 9a→smoothing capacitor 11→diode 10a, and by a route of inductor 9b→smoothing capacitor 11→diode 10b.

Then, when the voltage of the capacitor 6a becomes nearly equal to Vin, so that the voltage of the capacitor 6b becomes almost zero, in the primary side of the transformer 8, a current flows by a route of inductor 7→transformer's primary winding 8a→second voltage-dividing capacitor 4b→inverse-parallel diode of second MOSFET 5b.

Thereafter, the second MOSFET 5b is turned ON. At this time, since the voltage applied between both ends of the second MOSFET 5b (the voltage of capacitor 6b) is almost zero thereby resulting in zero-voltage switching, switching loss of the second MOSFET 5b is almost zero.

Further, when the first MOSFET 5a is in OFF-state and the second MOSFET 5b is in ON-state, in the primary side of the transformer 8, a current flows by a route of second voltage-dividing capacitor 4b→transformer's primary winding 8a→inductor 7→second MOSFET 5b, so that a voltage of −½·Vin is applied to the transformer's primary winding 8a. As a result, in the secondary side of the transformer 8, a voltage determined by the turn ratio of the transformer is induced in the transformer's secondary winding 8b, whereby a current flows by a route of transformer's secondary winding 8b→inductor 9b→smoothing capacitor 11→diode 10a, so that power transfer is achieved from the primary side to the secondary side of the transformer 8.

Then, when the second MOSFET 5b is turned OFF to enter the period of dead time td, because of the nature of the inductor 7 going to keep flowing a current, in the primary side of the transformer 8, currents flow by a route of inductor 7→capacitor 6b→second voltage-dividing capacitor 4b→transformer's primary winding 8a, and by a route of inductor 7→capacitor 6a→first voltage-dividing capacitor 4a→transformer's primary winding 8a. At this time, due to the effect of the capacitor 6b, a voltage rise of the voltage between both ends of the second MOSFET 5b is made slower, resulting in OFF operation by zero-voltage switching.

Further, the voltage between both ends of the capacitor 6a decreases as the voltage between both ends of the capacitor 6b increases, and this condition continues until the voltage of the capacitor 6b becomes nearly equal to the voltage sum Vin of the first and second voltage-dividing capacitors 4a, 4b so that the voltage of the capacitor 6a becomes almost zero.

Further at this time, in the secondary side of the transformer 8, currents flow by a route of inductor 9a→smoothing capacitor 11→diode 10a, and by a route of inductor 9b→smoothing capacitor 11→diode 10b.

Then, when the voltage of the capacitor 6b becomes nearly equal to Vin, so that the voltage of the capacitor 6a becomes almost zero, in the primary side of the transformer 8, a current flows by a route of inductor 7→inverse-parallel diode of first MOSFET 5a→first voltage-dividing capacitor 4a→transformer's primary winding 8a.

Thereafter, the first MOSFET 5a is turned ON, so that the condition returns to that when the first MOSFET 5a is in ON-state and the second MOSFET 5b is in OFF-state. Even at this time, since the voltage applied between both ends of the first MOSFET 5a (the voltage of capacitor 6a) is almost zero thereby resulting in zero-voltage switching, switching loss of the first MOSFET 5a is almost zero.

At the time of zero-voltage switching of the first and second MOSFETs 5a, 5b as described above, the capacitors 6a, 6b connected in parallel to the respective first and second MOSFETs 5a, 5b exert their functions. In order to establish zero-voltage switching of the first and second MOSFETs 5a, 5b, it is necessary that the voltage of the capacitor 6a or 6b increases to the voltage sum Vin of the first and second voltage-dividing capacitors 4a, 4b, or decreases to near zero voltage. Hereinafter, such a time period is referred to as a "charge/discharge completion time" of the capacitors 6a, 6b, that is necessary for the voltage of the capacitor 6a or 6b to increase to the voltage sum Vin of the first and second voltage-dividing capacitors 4a, 4b or to decrease to near zero voltage, by turning ON or OFF of the first and second MOSFETs 5a, 5b.

The voltages of the capacitors 6a, 6b vary depending on a current through the inductor 7 which is a current for charging/discharging the capacitors 6a, 6b. Thus, when the load 13 becomes light so that the output power of the DC/DC converter 20 is low, that is, the current through the inductor 7 decreases, the charge/discharge completion time of the capacitors 6a, 6b increases.

Figure 3:
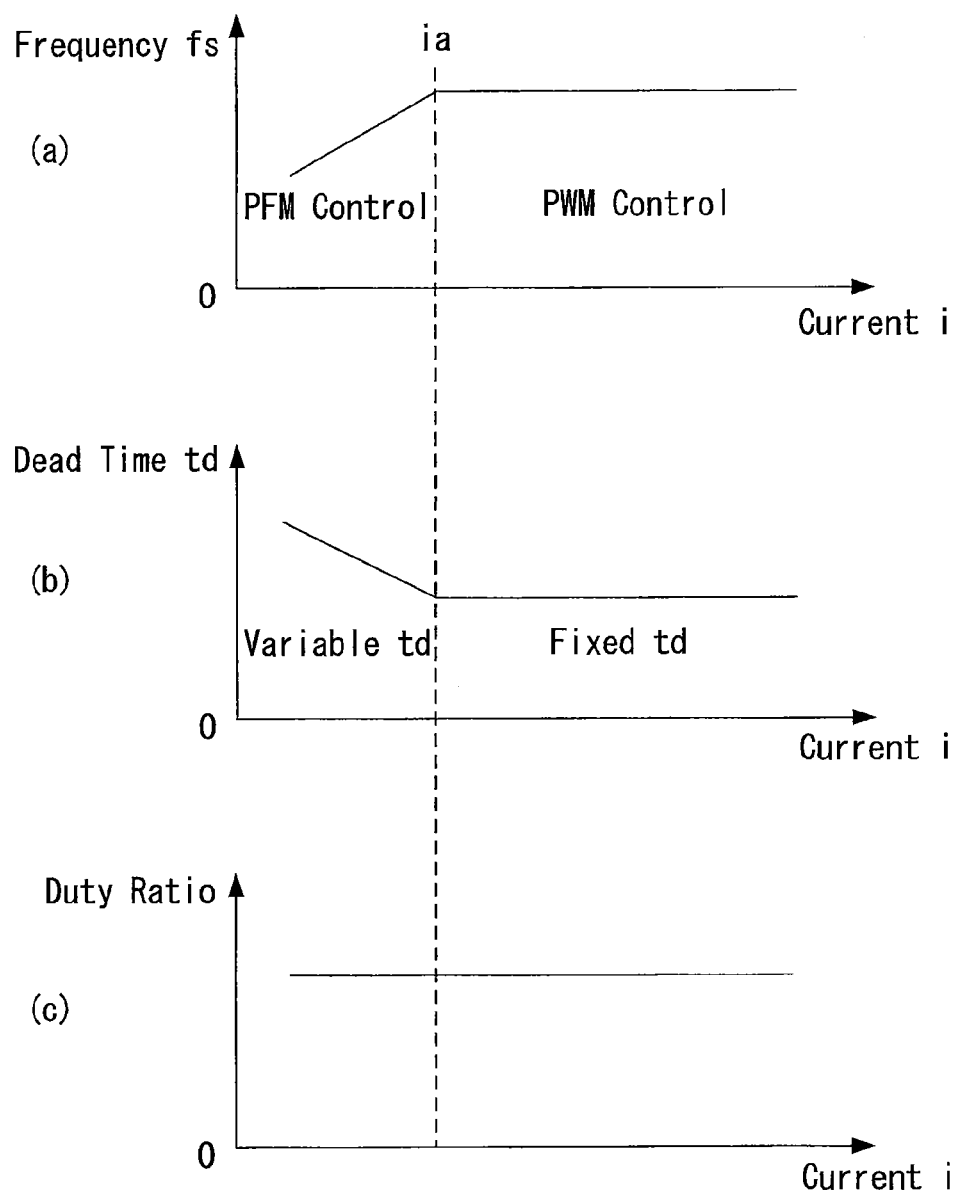
FIG. 3 is a characteristic diagram for illustrating an operation of the power conversion device according to Embodiment 1 of the invention.

FIG. 3 is a diagram for illustrating a control and an operation by the first and second MOSFETs 5a, 5b in the inverter unit 15. As shown in FIG. 3, the control circuit 30 changes its control according to the current i from the current detector 3. Since the current through the inductor 7 depends on the load current, and the current i from the current detector 3 also depends on the load current, it can be said that the voltages of the capacitors 6a, 6b vary according to the current i that depends on the load current.

In the range of the current i being more than a predetermined value ia, that is the load 13 is in a load range from a middle road to a rated load, the control circuit 30 controls the inverter unit 15 using a PWM control, and when the current i becomes the predetermined value ia or less, that is the load 13 becomes in a light load range lighter than a predetermined load, the control circuit changes the control to a PFM control (Pulse Frequency Modulation Control).

Although the dead time td is fixed in a PWM control which is constant in its frequency, according to the PFM control in such a low current range, its frequency is decreased so as to make the dead time td longer as the current i decreases. In this way, the duty ratio to obtain an intended output voltage is kept without change.

As mentioned above, when the load 13 becomes light so that the output power of the DC/DC converter 20 is low, that is, the current i decreases, the charge/discharge completion time of the capacitors 6a, 6b at the time of switching of the first and second MOSFETs 5a, 5b increases. In this embodiment, the control is changed to a PFM control when the current i becomes a predetermined value is or less, and the dead time td is made longer as the current i decreases, to thereby control switching of the first and second MOSFETs 5a, 5b. The dead time td is set longer than the charge/discharge completion time of the capacitors 6a, 6b which increases as the current i decreases.

This makes it possible, over a wide range of load, for the voltage of the capacitor 6a or 6b to increase to the voltage sum Vin of the first and second voltage-dividing capacitors 4a, 4b or to decrease to near zero voltage within the time period of the dead time td in the switching operations of the first and second MOSFETs 5a, 5b, so that zero-voltage switching can be stably performed with good reliability. Accordingly, it becomes possible to largely reduce power loss, to thereby achieve a DC/DC converter device with high conversion efficiency and an in-vehicle power supply device using the same.

It is noted that, in the above embodiment, the current detector 3 is connected in the DC bus line in the input side of the inverter unit 15, and detects the input current; however, the detector is not limited thereto and it may be any device that can detect a current which flows through the DC/DC converter 20 and which varies depending on the load current.

Further, in the above Embodiment 1, description has been made using a MOSFET as each of the two serial semiconductor switching elements 5a, 5b; however, a similar effect is achieved instead using a bipolar transistor, an insulated gate bipolar transistor (IGBT), a silicon carbide transistor or a MOSFET formed of a wide bandgap semiconductor.

The wide bandgap semiconductor is a semiconductor that is wider in bandgap than silicon, examples of which include silicon carbide, a gallium nitride-family material and diamond. Since a switching element formed of such a wide bandgap semiconductor has a high breakdown voltage and a high allowable current density, the switching element can be made compact, so that it is possible to facilitate downsizing of an in-vehicle power supply device by using the switching element thus-made compact. Further, because of low power loss, the switching element can be enhanced in its efficiency, to thereby enhance the efficiency of the in-vehicle power supply device.

In addition, since the switching element formed of the wide bandgap semiconductor has a-high heat resistance, it is possible to downsize a heat dissipation fin of a heat sink as well as to change a water-cooling part to an air-cooling one, which are generally juxtaposed to the in-vehicle power supply device, so that the in-vehicle power supply device can be more downsized.

Further, in the above Embodiment 1, although the inductor 7 is described as an independent element, a leakage inductance from the transformer 8 may instead be used, whereby a similar effect can be achieved.

Furthermore, as the first and second capacitors 6a, 6b connected respectively in parallel to the first and second MOSFETs 5a, 5b, parasitic capacitances parasitized between respective both ends of the first MOSFET 5a and the second MOSFET 5b may instead be used, whereby a similar effect can be achieved.

Further, in the above Embodiment 1, although the inverter unit 15 is configured as a half-bridge inverter, other variety of inverter circuits may instead be applied, whereby a similar effect can be achieved.

Further, in the above Embodiment 1, description has been made using a configuration of current-doubler rectifier circuit, as the circuit configuration of the secondary side of the transformer 8; however, it may instead be a circuit configuration of center-tap rectification or diode-bridge rectification, whereby a similar effect can be achieved.

Further, in the above Embodiment 1, as the rectifier circuit 10, a diode rectifier circuit using the diodes 10a, 10b is shown; however, it may instead be configured as a synchronous rectifier circuit with semiconductor switching elements. In this case, the control circuit 30 controls switching of the semiconductor switching elements in the rectifier circuit, in synchronization with the first and second MOSFETs 5a, 5b in the inverter unit 15. This reduces conduction loss in the rectifier circuit.

In addition, by forming the semiconductor switching elements in the rectifier circuit with a wide bandgap semiconductor, there are achieved more reduction in the loss, more downsizing and more enhancement in the efficiency.

Further, in the above Embodiment 1, the dead time td is shown in the figure as that increasing linearly as the current decreases in the period of PFM control of the inverter unit 15; however, it may increase in a curvilinear or stepwise fashion, and thus it may be any dead time that is set longer than the charge/discharge completion time of the capacitors 6a, 6b which increases as the current decreases.

Further, in the above Embodiment 1, although the DC/DC converter device is shown as that applied to an in-vehicle power supply device, it can be applied to other than vehicles, whereby a similar effect can be achieved. In addition, the DC/DC converter device may be configured without the transformer 8 for insulation.

Embodiment 2

Next, Embodiment 2 of the invention will be described.

A power conversion device and an in-vehicle power supply device whose circuit configuration is similar to that shown in FIG. 1 of the above Embodiment 1, are applied to this Embodiment 2, in which the respective potentials VH, VL of the output terminals 2c, 2d and the current i detected by the current detector 3 are input to the control circuit 30, so that the control circuit generates and outputs first and second gate signals 30a, 30b similar to those shown in FIG. 2 to the first and second MOSFETs 5a, 5b in the inverter unit 15. In this instance, however, a way to control the first and second MOSFETs 5a, 5b by the control circuit 30 is different to that in the above Embodiment 1, as described below.

Figure 4:
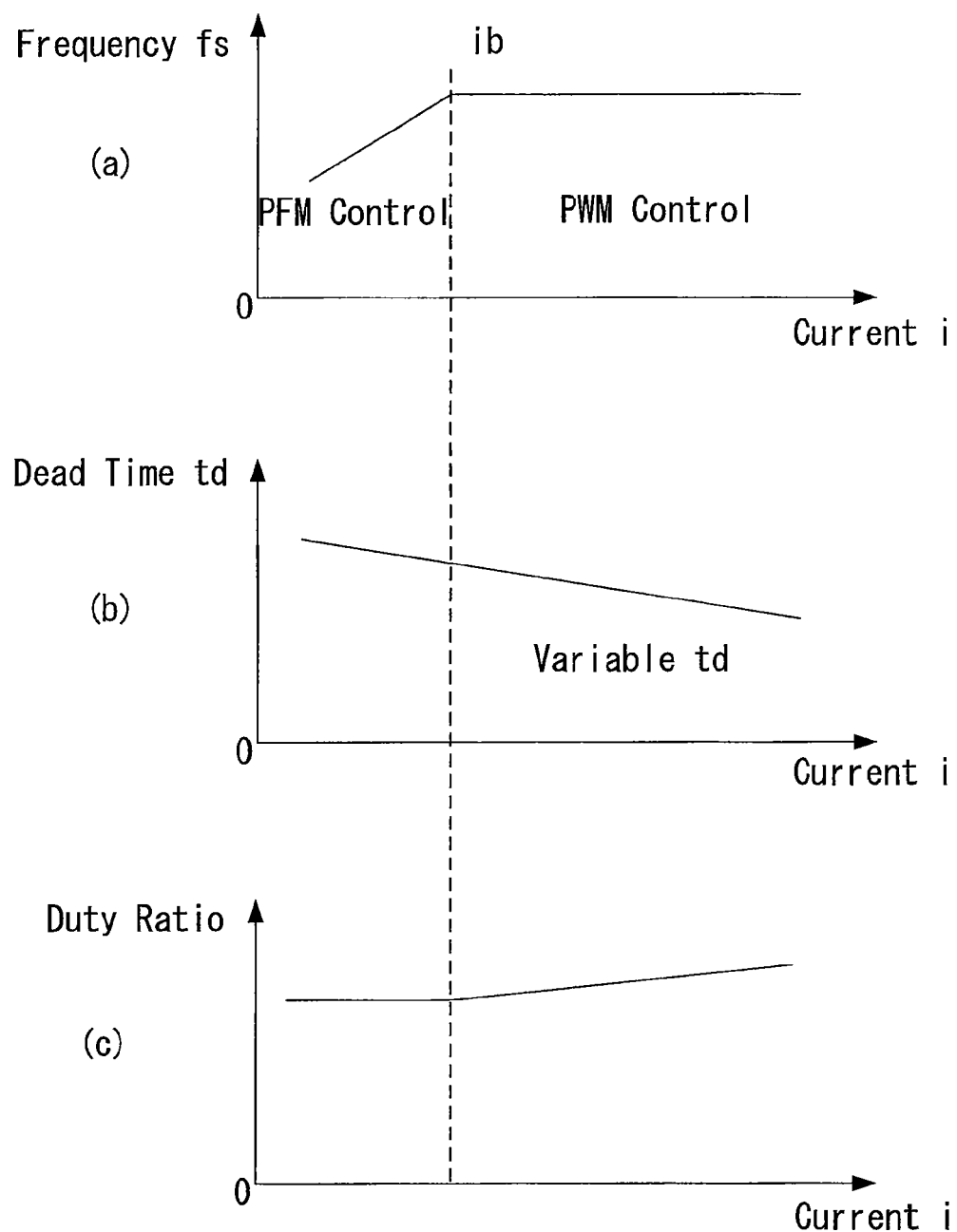
FIG. 4 is a characteristic diagram for illustrating an operation of a power conversion device according to Embodiment 2 of the invention.

FIG. 4 is a diagram for illustrating a control and an operation by the first and second MOSFETs 5a, 5b in the inverter unit 15, according to Embodiment 2. As shown in FIG. 4, in the range of the current i being more than a predetermined value ib, that is the load 13 is in a load range from a middle road to a rated load, the control circuit 30 controls the inverter unit 15 using a PWM control; and when the current i becomes the predetermined value ib or less, that is the load 13 becomes in a light load range lighter than a predetermined load, the control circuit changes the control to a PFM control.

Generally, there is a margin to some extent in the duty ratio to obtain an intended output voltage. Thus, even in the PWM control with a constant frequency, within an allowed range of the duty ratio, the first and second MOSFETs 5a, 5b are controlled so that the dead time td becomes longer as the current i decreases. Besides, in the PFM control in the low current range, the frequency is decreased so as to make the dead time td longer as the current i decreases, to thereby keep the duty ratio without change.

The dead time td is set longer than the charge/discharge completion time of the capacitors 6a, 6b which increases as the current i decreases.

As mentioned previously, when the load 13 becomes light so that the output power of the DC/DC converter 20 is low, that is, the current i decreases, the charge/discharge completion time of the capacitors 6a, 6b at the time of switching of the first and second MOSFETs 5a, 5b increases. Thus, the first and second MOSFETs 5a, 5b are controlled with the dead time td which is set longer than the charge/discharge completion time.

This makes it possible, over a wide range of load, for the voltage of the capacitor 6a or 6b to increase to the voltage sum Vin of the first and second voltage-dividing capacitors 4a, 4b or to decrease to near zero voltage within the time period of the dead time td in the switching operations of the first and second MOSFETs 5a, 5b, so that zero-voltage switching can be stably performed with good reliability. Accordingly, as similar to the above Embodiment 1, it becomes possible to largely reduce power loss, to thereby achieve a DC/DC converter device with high conversion efficiency and an in-vehicle power supply device using the same.

It is noted that, here, the previously-mentioned examples of various modifications applicable to the above Embodiment 1, can be applied, whereby a similar effect can be achieved.

Embodiment 3

Next, Embodiment 3 of the invention will be described.

A power conversion device and an in-vehicle power supply device whose circuit configuration is similar to that of the above Embodiment 1, are also applied to this Embodiment 3; however, a way to control the first and second MOSFETs 5a, 5b by the control circuit 30 is different to that in the above Embodiment 1.

Figure 5:
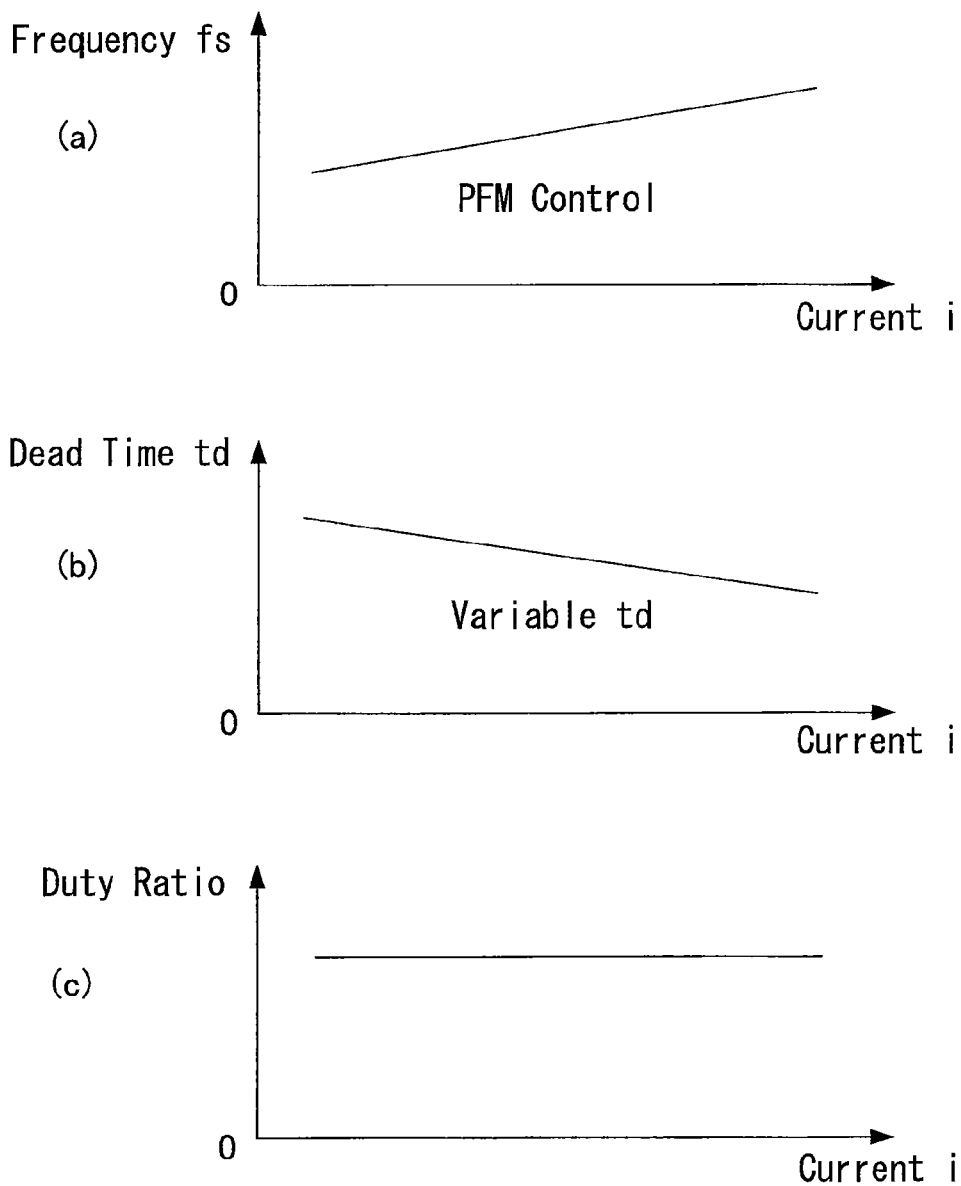
FIG. 5 is a characteristic diagram for illustrating an operation of a power conversion device according to Embodiment 3 of the invention.

FIG. 5 is a diagram for illustrating a control and an operation by the first and second MOSFETs 5a, 5b in the inverter unit 15, according to Embodiment 3. As shown in FIG. 5, the control circuit 30 controls the first and second MOSFETs 5a, 5b by a PFM control. Further, the frequency is decreased so as to make the dead time td longer as the current i decreases, to thereby keep without change the duty ratio to obtain an intended voltage. The dead time td is set longer than the charge/discharge completion time of the capacitors 6a, 6b which increases as the current i decreases.

As mentioned previously, when the load 13 becomes light so that the output power of the DC/DC converter 20 is low, that is, the current i decreases, the charge/discharge completion time of the capacitors 6a, 6b at the time of switching of the first and second MOSFETs 5a, 5b increases. Thus, the first and second MOSFETs 5a, 5b are controlled with the dead time td which is set longer than the charge/discharge completion time of the capacitors 6a, 6b.

This makes it possible, over a wide range of load, for the voltage of the capacitor 6a or 6b to increase to the voltage sum Vin of the first and second voltage-dividing capacitors 4a, 4b or to decrease to near zero voltage within the time period of the dead time td in the switching operations of the first and second MOSFETs 5a, 5b, so that zero-voltage switching can be stably performed with good reliability. Accordingly, as similar to the above Embodiment 1, it becomes possible to largely reduce power loss, to thereby achieve a DC/DC converter device with high conversion efficiency and an in-vehicle power supply device using the same.

It is noted that, here, the previously-mentioned examples of various modifications applicable to the above Embodiment 1, can be applied, whereby a similar effect can be achieved.

Embodiment 4

Next, Embodiment 4 of the invention will be described.

Figure 6:
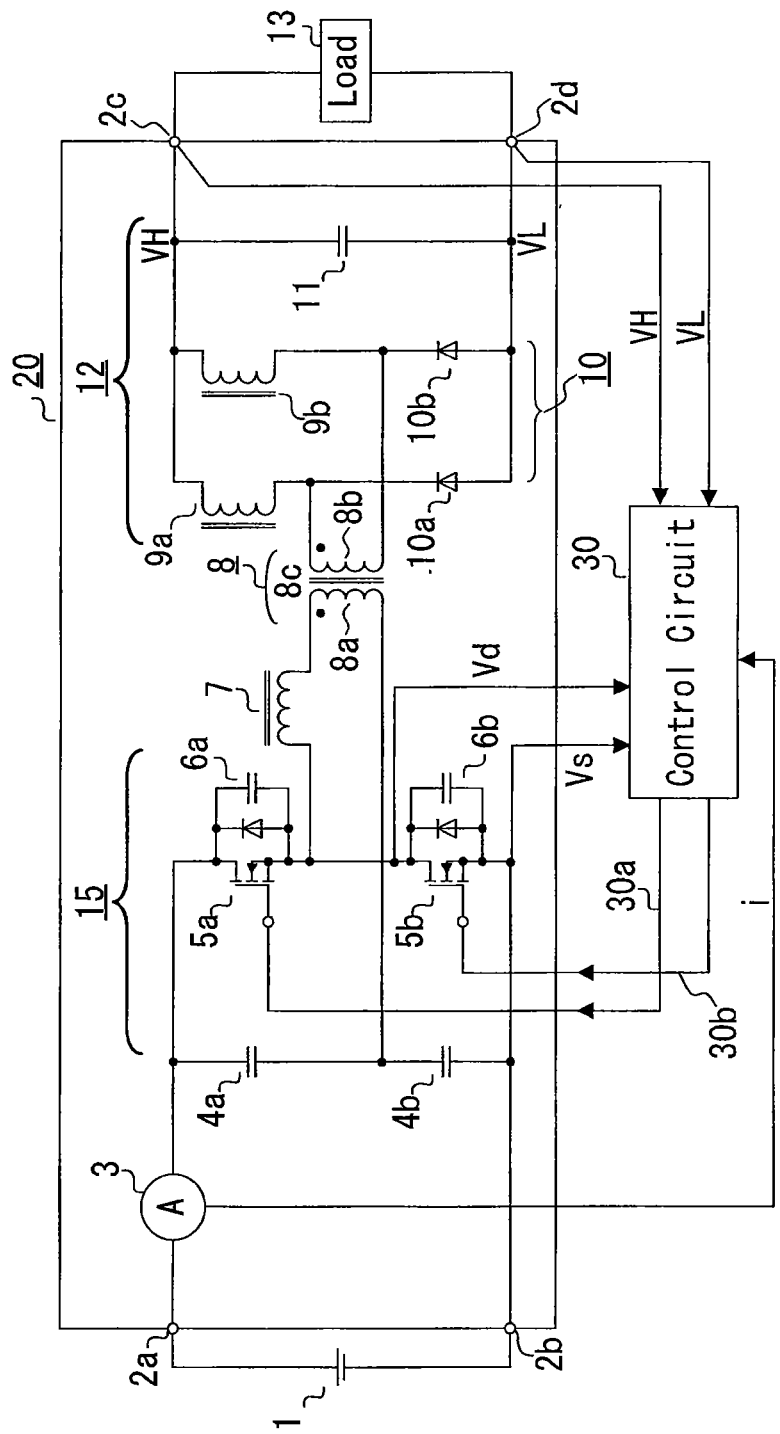
FIG. 6 is a configuration diagram of a power conversion device and an in-vehicle power supply device according to Embodiment 4 of the invention.

FIG. 6 is a configuration diagram of a DC/DC converter device as a power conversion device, and an in-vehicle power supply device, according to Embodiment 4 of the invention. As shown in FIG. 6, the respective potentials VH, VL of the output terminals 2c, 2d and the current i detected by the current detector 3, as well as the respective potentials Vd, Vs of the drain terminal and the source terminal of the second MOSFET 5b, are input to the control circuit 30, so that the control circuit generates and outputs first and second gate signals 30a, 30b to the first and second MOSFETs 5a, 5b in the inverter unit 15. The other configurations are similar to those in the above Embodiment 1.

The basic control by the control circuit 30 is similar to in the above Embodiment 1. In the range of the current i being more than a predetermined value ia, that is the load 13 is in a load range from a middle road to a rated load, the control circuit controls the inverter unit 15 using a PWM control while fixing the dead time td, and when the current i becomes the predetermined value ia or less, that is the load 13 becomes in a light load range lighter than a predetermined load, the control circuit changes the control to a PFM control. Besides, in the PFM control in such a low current range, the frequency is decreased so as to make the dead time td longer as the current i decreases. In this way, the duty ratio to obtain an intended output voltage is kept without change.

In this instance, the control circuit 30 detects and observes the voltage between both ends of the second MOSFET 5b from the respective potentials Vd, Vs of the drain terminal and the source terminal of the second MOSFET 5b; and based on the both ends voltage, adjusts switching of the first and second MOSFETs 5a, 5b so that the first and second MOSFETs 5a, 5b perform zero-voltage switching. Zero-voltage switching of the first and second MOSFET 5a, 5b is established when the voltage of the capacitor 6a or 6b, that is the voltage between both ends of the first or second MOSFET 5a or 5b, is nearly equal to the voltage sum Vin of the first and second capacitors 4a, 4b, or nearly equal to zero. Thus, the both ends voltage of the second MOSFET 5b is observed, and the timing of switching is adjusted so that each of the first and second MOSFET 5a, 5b is turned ON or OFF at the time this voltage becomes nearly equal to Vin, or nearly equal to zero.

Accordingly, a similar effect to that in the above Embodiment 1 is achieved, and the first and second MOSFET 5a, 5b can surely perform zero-voltage switching, so that power loss can be further reduced, to thereby achieve a DC/DC converter device with higher conversion efficiency and an in-vehicle power supply device using the same.

It is noted that in the above Embodiment 4, the basic control by the control circuit 30 is described as similar to in the above Embodiment 1; however, it may be similar to in the above Embodiments 2 or 3. In any of such cases, the first and second MOSFET 5a, 5b can surely perform zero-voltage switching, so that power loss can be further reduced, to thereby achieve a DC/DC converter device with higher conversion efficiency and an in-vehicle power supply device using the same.

Here, the previously-mentioned examples of various modifications applicable to the above Embodiment 1, can be applied, whereby a similar effect can be achieved.

Embodiment 5

Next, Embodiment 5 of the invention will be described.

Figure 7:
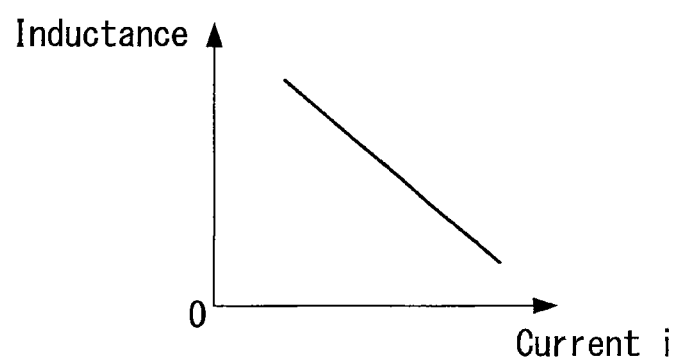
FIG. 7 is an inductor-characteristic diagram according to Embodiment 5 of the invention.

This Embodiment 5 corresponds to the above any Embodiment 1 to 4, but in which an inductor 7 having a variable characteristic is used. FIG. 7 is a characteristic diagram of the inductor 7 according to Embodiment 5, in which the inductance is variable according to the current, so that the inductance decreases as the current increases.

When the inductance is constant, the commutation time in the inductor 7 at the time of switching the first and second MOSFETs 5a, 5b increases as the current flowing through the DC/DC converter 20 increases. In this embodiment, since the inductor 7 decreases its inductance as the current increases, it is possible to shorten the commutation time. Thus, the DC/DC converter 20 is furthermore reduced in the loss, to enhance its power conversion efficiency.

Further, since zero-voltage switching is established by use of the commutation in the inductor 7, in this embodiment, the dead time td is set based on both the current i and the inductance of the inductor 7 that varies according to the current i, in such a manner that the frequency is deformed to a non-linear format the time of the PFM control, for example, so as to enable zero-voltage switching and obtain an intended output voltage. This makes it possible to surely perform zero-voltage switching and to elevate the lower limit value of the operating frequency, so that the magnetic parts in the DC/DC converter 20 can be made compact.

It should be noted that unlimited combination of the respective embodiments, modification of the embodiments and omission in the embodiments may be made in the present invention without departing from the scope of the invention.

The invention claimed is:

1. A power conversion device comprising:
a DC/DC converter that includes an inverter unit having two serial semiconductor switching elements for converting a DC power to an AC power, a rectifier circuit for rectifying an AC output from the inverter unit, and a smoothing circuit for smoothing a rectified voltage to output a DC power to a load; and
a control circuit for controlling the inverter unit,
wherein the inverter unit includes capacitors connected respectively in parallel to the semiconductor switching elements, and an inductor, connected to a line of the AC output, which is made variable in its inductance according to a circuit current flowing through the DC/DC converter, so that the inductance decreases as the circuit current increases,
the control circuit changes a dead time, which is a time period where both of said two serial semiconductor switching elements are made OFF, according to the circuit current, so as to cause the respective semiconductor switching elements to perform zero-voltage switching, and
at least in the range of the circuit current being equal to or less than a predetermined value, the control circuit controls the inverter unit using a PFM control.

2. The power conversion device of claim 1, wherein the control circuit controls the inverter unit using a PWM control in the range of the circuit current being more than the predetermined value, and then changes this control to the PFM control when the circuit current becomes the predetermined value or less.

3. The power conversion device of claim 1, wherein the control unit increases the dead time when the circuit current decreases.

4. The power conversion device of claim 1, further comprising a current detector that detects the circuit current flowing through the DC/DC converter.

5. The power conversion device of claim 1, further comprising, between DC bus lines of the inverter unit, two serial voltage-dividing capacitors for dividing an input DC voltage, so that the inverter unit is configured as a half-bridge inverter.

6. The power conversion device of claim 1, further comprising a transformer connected to the AC side of the inverter unit, wherein a primary winding of the transformer, the inductor and the line of the AC output are connected serially, and a secondary winding of the transformer is connected to the rectifier circuit.

7. The power conversion device of claim 1, wherein the rectifier circuit includes a semiconductor switching element, and the control circuit controls switching of the semiconductor switching element in the rectifier circuit, in synchronization with said two serial semiconductor switching elements in the inverter unit.

8. The power conversion device of claim 7, wherein the semiconductor switching element in the rectifier circuit is formed of a wide bandgap semiconductor that is wider in bandgap than silicon.

9. The power conversion device of claim 1, wherein the semiconductor switching elements in the inverter unit are formed of a wide bandgap semiconductor that is wider in bandgap than silicon.

10. A power conversion device comprising:
a DC/DC converter that includes an inverter unit having two serial semiconductor switching elements, for converting a DC power to an AC power, a rectifier circuit for rectifying an AC output from the inverter unit, and a smoothing circuit for smoothing a rectified voltage to output a DC power to a load; and
a control circuit for controlling the inverter unit,
wherein the inverter unit includes capacitors connected respectively in parallel to the semiconductor switching elements, and an inductor connected to a line of the AC output,
the control circuit changes a dead time, which is a time period where both of said two serial semiconductor switching elements are made OFF, according to a circuit current flowing through the DC/DC converter, so as to cause the respective semiconductor switching elements to perform zero-voltage switching,
at least in the range of the circuit current being equal to or less than a predetermined value, the control circuit controls the inverter unit using a PFM control, and
a voltage between both ends of one of said two serial semiconductor switching elements is detected, and the control circuit adjusts switching of said two serial semiconductor switching elements according to the voltage detected.

11. The power conversion device of claim 10, wherein the control circuit controls the inverter unit using a PWM control in the range of the circuit current being more than the predetermined value, and then changes this control to the PFM control when the circuit current becomes the predetermined value or less.

12. The power conversion device of claim 10, wherein the control unit increases the dead time when the circuit current decreases.

13. The power conversion device of claim 10, further comprising a current detector that detects the circuit current flowing through the DC/DC converter.

14. The power conversion device of claim 10, further comprising, between DC bus lines of the inverter unit, two serial voltage-dividing capacitors for dividing an input DC voltage, so that the inverter unit is configured as a half-bridge inverter.

15. The power conversion device of claim 10, further comprising a transformer connected to the AC side of the inverter unit, wherein a primary winding of the transformer, the inductor and the line of the AC output are connected serially, and a secondary winding of the transformer is connected to the rectifier circuit.

16. The power conversion device of claim 10, wherein the rectifier circuit includes a semiconductor switching element, and the control circuit controls switching of the semiconductor switching element in the rectifier circuit, in synchronization with said two serial semiconductor switching elements in the inverter unit.

17. The power conversion device of claim 16, wherein the semiconductor switching element in the rectifier circuit is formed of a wide bandgap semiconductor that is wider in bandgap than silicon.

18. The power conversion device of claim 10, wherein the semiconductor switching elements in the inverter unit are formed of a wide bandgap semiconductor that is wider in bandgap than silicon.

19. An in-vehicle power supply device comprising:
a power conversion device; and
a battery for driving a motor for running,
said power conversion device including
a DC/DC converter that includes an inverter unit having two serial semiconductor switching elements for converting a DC power to an AC power, a rectifier circuit for rectifying an AC output from the inverter unit, and a smoothing circuit for smoothing a rectified voltage to output a DC power to a load, and
a control circuit for controlling the inverter unit,
wherein the inverter unit includes capacitors connected respectively in parallel to the semiconductor switching elements, and an inductor, connected to a line of the AC output, which is made variable in its inductance according to a circuit current flowing through the DC/DC converter, so that the inductance decreases as the circuit current increases, and the DC power is input to the inverter unit from the battery,
the control circuit changes a dead time, which is a time period where both of said two serial semiconductor switching elements are made OFF, according to the circuit current, so as to cause the respective semiconductor switching elements to perform zero-voltage switching, and
in the range of the circuit current being equal to or less than a predetermined value, the control circuit controls the inverter unit using a PFM control.

20. An in-vehicle power supply device comprising:
a power conversion device; and
a battery for driving a motor for running,
said power conversion device including
a DC/DC converter that includes an inverter unit having two serial semiconductor switching elements for converting a DC power to an AC power, a rectifier circuit for rectifying an AC output from the inverter unit, and a smoothing circuit for smoothing a rectified voltage to output a DC power to a load, and
a control circuit for controlling the inverter unit,
wherein the inverter unit includes capacitors connected respectively in parallel to the semiconductor switching elements, and an inductor connected to a line of the AC output,
the DC power is input to the inverter unit from the battery,
the control circuit changes a dead time, which is a time period where both of said two serial semiconductor switching elements are made OFF, according to a circuit current flowing through the DC/DC converter, so as to cause the respective semiconductor switching elements to perform zero-voltage switching,
in the range of the circuit current being equal to or less than a predetermined value, the control circuit controls the inverter unit using a PFM control, and
a voltage between both ends of one of said two serial semiconductor switching elements is detected, and the control circuit adjusts switching of said two serial semiconductor switching elements according to the voltage detected.

* * * * *